UNITED STATES PATENT OFFICE.

WM. C. RONEY AND JAMES H. RONEY, OF GALLUPVILLE, NEW YORK.

IMPROVED VEGETABLE OINTMENT OR SALVE.

Specification forming part of Letters Patent No. 43,341, dated June 28, 1864.

*To all whom it may concern:*

Be it known that we, WILLIAM C. RONEY and JAMES H. RONEY, of Gallupville, in the county of Schoharie and State of New York, have invented a new compound of vegetable substances, which, when prepared, produces ointment and also sticking-salve for curing all cutaneous and other diseases. The ingredients have the highest medical authority, being composed of some of the most active medicines. The process of manufacture is simple, and the ingredients, when combined, produce a superior ointment and sticking-salve of a purely-vegetable nature, free from all dangerous compounds, and possessing advantages over other inventions, the nature of which will be set forth in the following specification.

The nature of our invention consists in combining, in proper and suitable proportions, the following ingredients prepared in a green state: beech bark, one pound; elder bark and leaves, three-fourths pound; bittersweet root and stalk, one-half pound; thornapple stalk and leaves, three-fourths pound; poke root, one-fourth pound; bean leaves and stalk, one and one-half pound; live-for-ever, two pounds; rosin, one-half pound; lard, one pound. After being steeped for a proper length of time the above compound is boiled and reboiled, and afterward strained, and the pieces are thoroughly extracted until said compound becomes of the consistency of molasses, after which a requisite quantity of lard is added, and it is again boiled until all the water is evaporated therefrom. The quantity of rosin above stated is then mixed, after which it is filled into small cans or boxes, and is ready for use.

The sticking-salve is composed of essentially the same materials as the ointment, with the addition of three pounds of rosin, three ounces of tallow, together with eight ounces of black thick sediment which remains after the ointment has been prepared.

We have fully tested our ointment and sticking-salve and find it cures cutaneous diseases, inflammations, irritable ulcers, inflamed tumors, piles, chronic rheumatism, catarrh, coughs, colds, and various other aliments too numerous to refer to; and to enable others skilled in the art to make and use the same we have stated the ingredients used by us and certify that the accompanying specimen of the vegetable ointment and sticking-salve is a correct sample of the same.

We claim—

The combination of the various ingredients above specified to produce a vegetable ointment and sticking-salve, substantially and for the purposes specified.

WILLIAM C. RONEY.
JAMES H. RONEY.

Witnesses:
ELIJAH L. TOMPKINS,
PETER A. RONEY.